Figure 4:
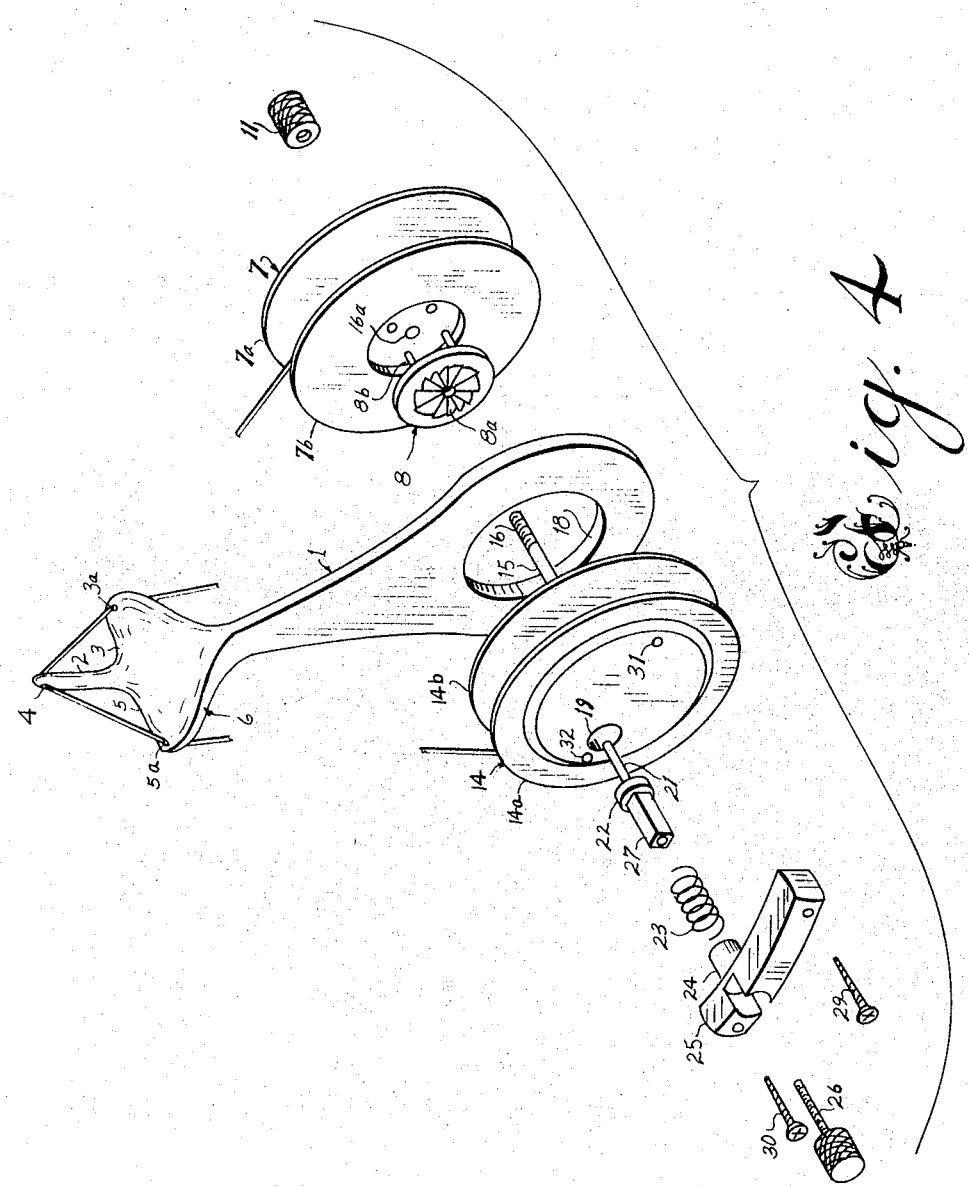

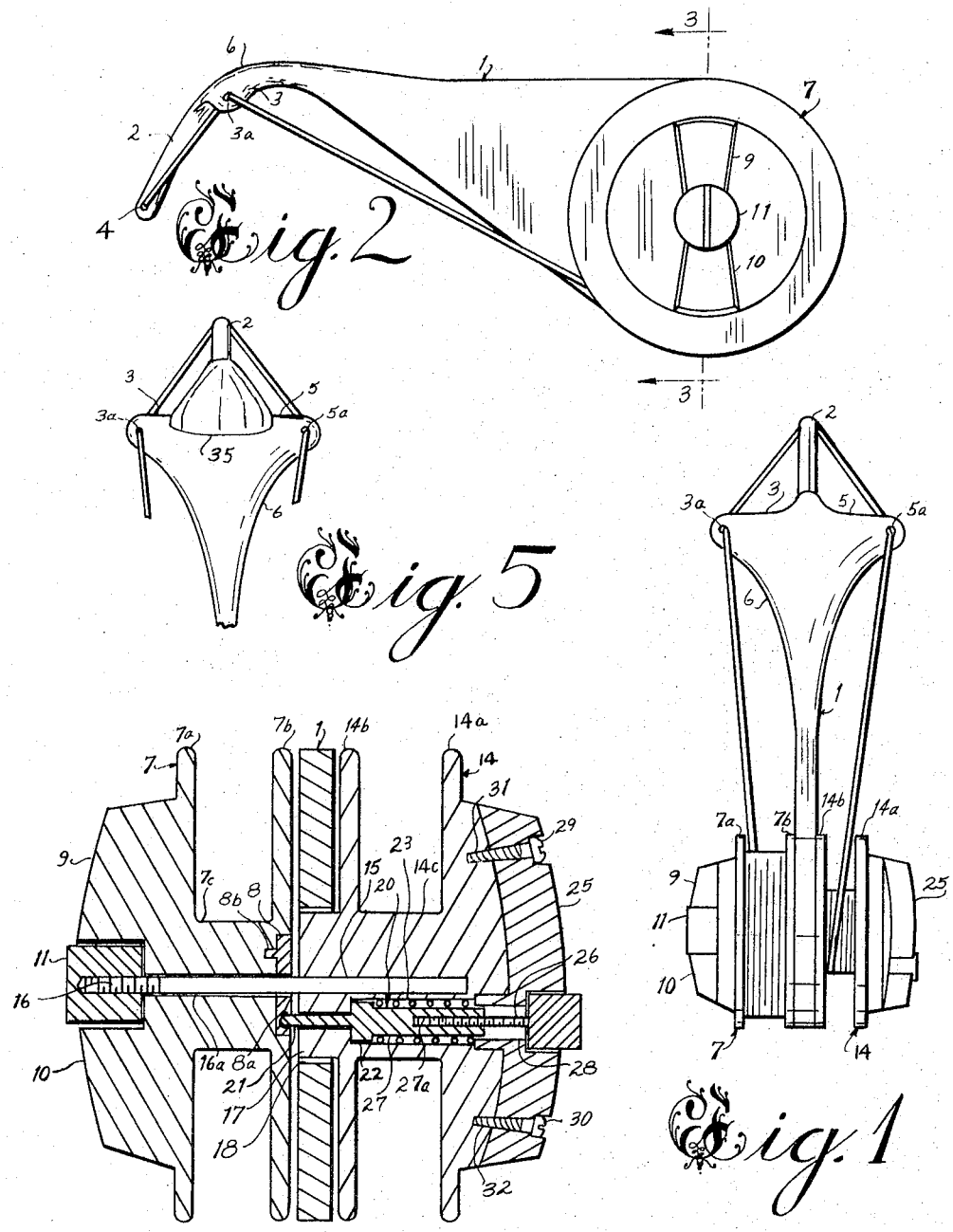

Sept. 12, 1967     L. M. COWAN     3,340,881
DENTAL FLOSS HOLDER

Filed Sept. 8, 1964     2 Sheets-Sheet 2

INVENTOR.
LAVERNE M. COWAN
BY
Newton, Hopkins & Jones
ATTORNEYS

United States Patent Office 3,340,881
Patented Sept. 12, 1967

3,340,881
DENTAL FLOSS HOLDER
Laverne M. Cowan, 641 Locust Circle,
Covington, Ga. 30209
Filed Sept. 2, 1964, Ser. No. 393,913
6 Claims. (Cl. 132—92)

This invention relates generally to an improvement in a dental floss holder wherein the dental floss is presented in a new manner to the user while cleaning teeth.

In the care of the teeth, one of the most successful methods of cleaning between the teeth is the proper use of dental floss. When properly using dental floss, the floss tape should be presented in a position parallel to the space between the teeth so that the tape is easily inserted between the teeth without excessive binding or wear on any portion of one of the teeth. Obviously, the effective use of dental floss in the mouth is difficult when attempted with the fingers, and in the case of posterior teeth it is a practical impossibility without uncomfortable distortion of the mouth and jaw. Even when the dental floss is successfully inserted between the posterior teeth, excessive wear is usually caused to one portion of a tooth since effective control cannot be maintained by manipulating the floss with the fingers.

The proper use of dental floss requires that it be manipulated in a vertical line direction between the teeth and that it penetrate throughout the inner proximal surfaces of the teeth. Because of the shape of the oral cavity and the size of the fingers with respect to the mouth, it is often difficult to effectively work the floss within the mouth.

The basic requirement for proper use of dental floss is control of the tape so as to prevent injury of the proximal tissue of the mouth. Proper control can be obtained by using a taut short section of tape and presenting this section at the proper angle between the teeth. Freedom of movement on either side of the teeth is also a requisite.

The invention disclosed herein gives accurate control to the user of dental floss since the tape guide is constructed so as to prevent the user from penetrating too deeply between the teeth. It further facilitates the control of the dental floss by utilizing an acute angle section of tape which can readily be introduced between the contacts of the teeth by a slicing action rather than a pushing action, and it further facilitates the introduction of tape between the teeth due to the fact that the tape guide can be introduced to the teeth buccally, lingually and/or occlusively. This invention has the advantage of allowing vertical motion of the tape between the teeth rather than by a sawing motion which is to be avoided because of wear and incomplete cleaning of the proximal sides of the teeth.

For the further comprehension of the invention, and of the objects and advantages thereof reference will be had to the following description and accompanying drawings and the appended claims in which the various novel features of the invention are more particularly set forth in the accompanying drawings forming a material part of this disclosure, in which:

FIG. 1 shows a back view of the dental floss holder;
FIG. 2 shows a side view of the dental floss holder;
FIG. 3 is a section on the line 3—3 of FIG. 1;
FIG. 4 is an exploded perspective view of the device; and,
FIG. 5 is a partial showing of the head portion of the dental floss holder with a glove type gaging means fitted thereon.

The dental floss holder, according to this invention, comprises a body portion 1, which functions as a handle and which is substantially flat and tapered towards its upper end. Integrally connected to the body portion at its upper tapered end is the head portion 6 which is disposed at an angle of 90° from the plane of the body portion. The head portion supports shoulder sections 3 and 5 and tape guide 2. Shoulder sections 3 and 5 have holes 3a and 5a respectively therein and the tape guide 2 has a top hole 4 therein, which holes are adapted to sequentially receive dental floss. Beginning at the upper end near the shoulders and head portion 6 is curved and disposed on an angle from the main body with the tape guide being on an angle generally parallel to the shoulder surface.

The lower portion of the body 1 is of a generally flat rounded configuration and describes a circular opening therein. Dental floss tape reels 7 and 14 are disposed on each side of the lower body portion 1. Tape reel 7 is composed of two disc-like portions 7a and 7b joined together by a shaft portion 7c, which is reduced in diameter from the diameter of the disc portion 7a and 7b. Disc portion 7b is adapted to detachably receive the backup ratchet plate 8. Ratchet plate 8 has on one side thereof indentations 8a, and on the other side knobs 8b. The knobs 8b are adapted to fit in correspondingly associated indentations in the reel disc 7b. Connected to the disc 7a are the finger turn levers 9 and 10, which are adapted to turn the tape reel 7.

Tape reel 14 also is comprised of disc portions 14a and 14b and a center portion 14c joining disc portions 14a and 14b together. Fixedly mounted in tape reel 14 is threaded rod 15 which is threaded at 16. Threaded rod 15 is adapted to extend through the circular opening of the lower portion of the body 1 and extend into aperture 16a of the tape reel 7. The threaded portion 16 is adapted to be engaged by the cap nut 11 on the remote side of the tape reel 7. When assembled in this manner it can be seen that reels 7 and 14 will be rotatively attached together by the cap nut 11, having the lower body portion clamped between the reels. Tape reel 14 has a bearing 17 mounted on the inward portion of disc 14b, and this bearing is adapted to engage a bearing surface 18 on the inner side of the circular opening of body 1. This bearing 18 will allow rotation of the tape reel 14 in relation to the body portion 1 and will also allow relative rotation between reels 7 and 14.

Tape reel 14 defines a hole 19 therein which extends through the discs 14a and 14b and the center portion 14c of the reel and is arranged to open into the circular opening of the body 1. Mounted in the hole 19 is a pawl 20, having an extension 21, a pawl stop 22 and a rectangular shank 27. The pawl stop 22 is adapted to engage a reduced section of hole 19 (FIG. 3) and the pawl extension 21 is disposed so as to engage the ratchet plate 8. Helical spring 23 is disposed around the rectangular shank 27 and adapted to engage the pawl stop 22 at one end and the fitting cap 24 at the other end. The fitting cap 24 is an integral part of the finger turn lever 25 which is adapted to be attached to the tape reel 14 by screws 29 and 30 fitting into threaded ports 31 and 32 of the reel 14. Finger turn lever and fitting cap 25 have a rectangular hole 28 passing therethrough which hole is adapted to receive the rectangular shank 27. Pawl screw 26 is adapted to engage the internal threads 27a of pawl shank 27. Because of the rectangular shape of the shank 27 and its rectangular hole 28 it can be seen that pawl screw 26 can be rotated to progressively engage the pawl 20, as the spring 23 tends to bias the pawl 20 away from the finger turn lever 25. Spring 23 also biases the pawl extension 21 into engagement with the ratchet plate 8 of tape reel 7. It should be noted that progressive clockwise rotation of the pawl screw 26 would tend to bring the pawl 20 in closer proximity with the finger turn lever 25, thereby tending to disengage the pawl extension 21 from the ratchet plate 8.

Since the pawl mechanism 20 is displaced from the axis of rotation of both of the tape reels 7 and 14, it can be seen that upon rotating tape reel 7 in relation to tape reel 14 the pawl extension 21 would be caused to rotate around the axis and engage the ratchet plate in a circular motion. Because of the configuration of the lands and grooves of the ratchet plate 8 the pawl extension 21 will be caused to reciprocate and allow relative rotation of one reel in respect to the other reel in one direction but prohibit relative rotation of the reels in the opposite direction. When independent rotation of the reels 7 and 14 is desired pawl screw 26 is rotated to the extent that pawl 20 will compress the spring 23 and withdraw the extension 21 from engagement with the ratchet plate 8. This means was provided in order to make adjustments while threading the device and more importantly to permit fresh tape to be supplied in the event the used reel became larger with used tape than the fresh reel.

In operation of the device, the user will attach a fresh tape reel 7 to the body 1 and the opposing tape reel 14 by inserting the threaded rod 15 through the circular opening of the body and through the aperture 16a of the fresh tape reel and engaging the cap nut 11 with the threads 16 of the rod 15. After attachment of the new reel to the device the user will take the loose end of the dental floss from the fresh tape reel 7, thread it through the opening 3a of shoulder 3, then through the opening 4 of tape guide 2, then through the opening 5a of the shoulder 5, and then finally wind the loose end of the tape around the used tape reel 14. At this point, the pawl screw 26 can be partially disengaged from the pawl shank 27 so as to allow the spring 23 to bias the pawl extension 21 into engagement with the ratchet plate 8. Because of this engagement, rotation of one reel will cause equal rotation of the opposite reel in the same direction. However, because of the configuration of the indentations 8a of ratchet wheel 8, and the resiliency of the spring 23, the user can rotate the tape reel 14 in a counterclockwise direction as seen in FIG. 4 and rotate the fresh tape reel 7 in a clockwise rotation by merely holding one reel and rotating the other reel. The action of the pawl extension 21 with the ratchet plate 8 during this operation will be such that the extension 21 will ride over the lands and grooves until the operator has tightened the dental floss tape through the holes 3a, 4 and 5a. After the dental floss is tightened the configuration of the ratchet plate 8 coacting with the pawl extension 21 will prevent clockwise rotation of the used tape reel 14 in relation to fresh tape reel 7, thereby maintaining the dental floss in a taut disposition through the holes of the body 1.

It can be seen that when a fresh tape reel is first placed on the device, the diameter of the tape on the fresh tape reel will be larger than that wound upon the used tape reel. Because of this association, rotation of the tape reels in unison to supply fresh tape to the device will cause the small amount of tape to be wound around the used tape reel 14 while a large amount of tape will be unwound from the new tape reel 7. After supplying new tape to the head of the device by such an action, the operator will simply cause the fresh tape reel to be rotated in a clockwise direction relative to the used tape reel, thereby taking up all the slack from the tape in the device and causing the tape at the head to be drawn tightly through the holes. After drawing the tape tightly through the holes, the action of the pawl extension 21 in relation to the ratchet plate 8 will be to prevent counterclockwise rotation of the fresh tape 7 in relation to the used tape reel 14 thereby maintaining the dental floss in a taut position.

After supplying the device with a fresh supply of tape in taut disposition the user can insert the head of the device in the mouth, and because of the angular disposition of the exposed tape at the head and guide portion 6 and 4 respectively, the tape will be held in a position substantially perpendicular to the row of teeth at the posterior portion of the mouth and approximately aligned with the spaces between the teeth. This position of the tape head will allow for ease of entry of the dental floss between the teeth without distortions of the mouth and jaw. Because of the acute angle of the tape at the tape guide section 2 it can be seen that the tape will enter the spaces between the teeth on an angle thereby presenting a slicing action between the teeth and preventing any wedging or sawing which would be caused by the use of tape with the fingers. The acute angle formed by the tape in relation to the tape guide 2 facilitates entry of the tape between the teeth through the buccal and lingual embrasures of the teeth. It will further be seen that reciprocal movement of the tape guide 2 from both buccal and lingual approaches will cause movement of the tape between the teeth to be in a vertical plane, thus cleaning the proximal surface of each tooth from the contact area to the gingival tissues. Unless the user is skilled in the process of using dental floss, vertical action between the teeth is difficult. For the most part, the tape used with the fingers is limited to a horizontal sawing action. Because of the double exposures of tape on each side of tape guide 2, it can be seen that the user will be able to clean both lower and upper teeth on one side of the oral cavity without withdrawing the device from his mouth.

Because of the simplicity and smoothness of design of the portion of the device that is inserted into the mouth of the user, the device is easily cleaned and readily able to be maintained in a sanitary condition.

FIG. 5 shows a glove type gaging means 35 which is constructed to conform with the shape of the shoulders 3 and 5 and the guide 2. The gaging means is made of flexible plastic and will slip over the guide 2 and snap around the shoulders so as to be firmly held thereon. The gaging means restricts the depth of penetration of the tape between the teeth and can be made in various thicknesses; a thicker gaging means to allow only a shallow penetration in the case of a child, or thinner gaging means to allow deeper penetration when needed. With the use of gaging means a single dental floss holder can be utilized with several gaging means to obtain various degrees penetration of the tape, thus minimizing the possibility of injury to the user.

It will be obvious to those skilled in the art that many variations may be made in the embodiments chosen for the purpose of illustrating the present invention without departing from the scope thereof as defined by the appended claims.

What is claimed as invention is:
1. A dental floss holder comprising:
  (A) A body having a head portion thereon,
    (1) Said head portion having shoulders and a tape guide, each defining a hole therethrough,
      (a) The holes of said shoulders and tape guide being triangularly disposed in relation to each other,
      (b) Said tape guide being disposed on an angle from said head portion,
  (B) Said body supporting a reel on each side thereof,
    (1) Said reels being rotatively connected to each other,
  (C) And ratchet means connected to one reel and pawl means connected to the other reel, said pawl means being spring biased to engage the ratchet whereby said reels can be rotated in unison or independently of each other.
2. A dental floss holder comprising:
  (A) A body having a head portion thereon,
    (1) Said head portion having shoulders and a tape guide, each defining a hole therethrough,
      (a) The holes of said shoulders and tape guide being triangularly disposed in relation to each other,
    (b) Said tape guide being disposed on an angle from said head portion,
(B) Said body supporting a reel on each side thereof,
    (1) Said reels being rotatively connected to each other,
(C) Ratchet means connected to one reel and pawl means connected to the other reel, said pawl means being spring biased to engage the ratchet whereby said reels can be rotated in unison or independently of each other.
    (1) Said pawl means having a rectangular base portion adapted to fit into a correspondingly formed portion of the reel,
    (2) And screw means adapted to engage said pawl base portion and to cause contraction of said spring, whereby said pawl will disengage said ratchet means.

3. In a device for supporting short pieces of dental floss in tension having a substantially flat handle, means on each side of said handle for supplying and retrieving said dental floss, said means comprising a supply reel and a retrieving reel whereby said supply reel is rotatively connected to said retrieving reel and supports a stop means thereon, said retrieving reel supporting a selectively engaging means for selectively engaging said stop means, whereby said wheels may be rotated in unison or independently of each other.

4. A dental floss holder comprising:
(A) A body including a substantially flat head portion,
    (1) Said head portion including shoulders and a tape guide intermediate said shoulders and extending at an angle away from said body,
        (a) Said shoulders and said tape guide defining holes triangularly disposed in relation to each other,
(B) Said body supporting a reel on each side thereof,
    (1) Said reels being rotatively connected to each other, and
(C) Means for causing one reel to rotate upon rotation of the other reel and for allowing the other reel to be independently rotated.

5. A dental floss holding device comprising a generally flat handle member extending in a first direction, a generally flat head member disposed in a plane generally perpendicular to said flat handle member and including a tape guide member and shoulder members on each side of said tape guide member, said shoulder members and said guide member extending in a direction from said handle member generally perpendicular to said first direction to present two exposed lengths of dental floss at an acute angle with respect to each other and in a plane generally perpendicular to said first direction.

6. A dental floss holding device comprising an elongated handle member extending in a first direction, a substantially flat head portion extending from said elongated handle member in a direction substantially at a right angle with respect to said first direction, the plane in which said substantially flat head portion is disposed being positioned substantially at a right angle with respect to said first direction, said substantially flat head portion including a pair of apertured shoulders and an elongated apertured tape guide extending outwardly from between said shoulders to support equal lengths of dental floss disposed at an angle with respect to each other and in a plane generally perpendicular with respect to said first direction.

References Cited

UNITED STATES PATENTS

| | | | |
|---|---|---|---|
| 1,512,633 | 10/1924 | Peckham | 132—92.1 |
| 1,570,357 | 1/1926 | Lawrenz | 132—92 |
| 1,658,221 | 2/1928 | Brown | 132—92 |
| 1,970,575 | 8/1934 | Rietzel | 132—91 |
| 2,098,610 | 11/1937 | Bluhm. | |
| 2,277,865 | 3/1942 | Jurovaty | 132—92 |
| 2,381,530 | 8/1945 | Dembenski | 132—92.1 |
| 2,451,849 | 10/1948 | Massimiano | 132—92 |
| 2,554,526 | 5/1951 | Dembenski | 132—92 |

RICHARD A. GAUDET, *Primary Examiner.*

G. McNEILL, *Assistant Examiner.*